United States Patent
Bolton et al.

[11] Patent Number: 6,128,662
[45] Date of Patent: *Oct. 3, 2000

[54] DISPLAY-MODEL MAPPING FOR TN3270 CLIENT

[75] Inventors: Derek W. Bolton, Balmain, Australia; Michael Boe, San Francisco, Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/920,470

[22] Filed: Aug. 29, 1997

[51] Int. Cl.$^7$ .............................. G06F 13/14; G06F 13/12
[52] U.S. Cl. ........................ 709/228; 709/227; 709/222; 709/218; 709/250
[58] Field of Search .................... 709/228, 218, 709/227, 249, 219, 203, 222, 250

[56] References Cited

U.S. PATENT DOCUMENTS

| | | | |
|---|---|---|---|
| 4,545,013 | 10/1985 | Lyon et al. | 714/712 |
| 4,644,532 | 2/1987 | George et al. | 370/255 |
| 4,750,109 | 6/1988 | Kita | 364/200 |
| 4,827,411 | 5/1989 | Arrowood et al. | 707/206 |
| 4,893,307 | 1/1990 | McKay et al. | 370/389 |
| 4,922,486 | 5/1990 | Lidinsky et al. | 370/427 |
| 4,965,772 | 10/1990 | Daniel et al. | 364/900 |
| 5,021,949 | 6/1991 | Morten et al. | 709/231 |
| 5,046,066 | 9/1991 | Messenger | 370/94.1 |
| 5,050,165 | 9/1991 | Yoshioka et al. | 370/401 |
| 5,142,622 | 8/1992 | Owens | 709/227 |
| 5,226,120 | 7/1993 | Brown et al. | 709/224 |
| 5,287,103 | 2/1994 | Kasprzyk et al. | 340/825 |
| 5,371,852 | 12/1994 | Attanasio et al. | 709/245 |
| 5,442,633 | 8/1995 | Perkins et al. | 370/94.1 |
| 5,473,608 | 12/1995 | Gagne et al. | 370/85.13 |
| 5,491,796 | 2/1996 | Wanderer et al. | 709/224 |
| 5,517,622 | 5/1996 | Ivanoff et al. | 709/232 |
| 5,526,358 | 6/1996 | Gregerson et al. | 709/224 |
| 5,544,162 | 8/1996 | Mraz et al. | 370/401 |
| 5,557,798 | 9/1996 | Skeen et al. | 705/35 |
| 5,559,955 | 9/1996 | Dev et al. | 714/4 |
| 5,583,862 | 12/1996 | Callon | 370/397 |
| 5,586,254 | 12/1996 | Kondo et al. | 714/25 |
| 5,588,119 | 12/1996 | Vincent et al. | 395/200.15 |
| 5,684,967 | 11/1997 | McKenna et al. | 395/329 |
| 5,684,988 | 11/1997 | Pitchaikani et al. | 707/104 |
| 5,737,525 | 4/1998 | Picazo, Jr. et al. | 1/1 |
| 5,754,830 | 5/1998 | Butts et al. | 395/500 |
| 5,764,625 | 6/1998 | Bournas | 370/231 |
| 5,796,728 | 8/1998 | Rondeau et al. | 370/338 |
| 5,802,313 | 9/1998 | Mitchell et al. | 709/238 |
| 5,805,822 | 9/1998 | Long et al. | 705/232 |
| 5,809,235 | 9/1998 | Sharma et al. | 709/230 |
| 5,845,081 | 12/1998 | Rangarajan et al. | 709/224 |
| 5,867,648 | 2/1999 | Forth et al. | 709/230 |
| 5,867,653 | 2/1999 | Aras et al. | 709/204 |

*Primary Examiner*—Dung C. Dinh
*Assistant Examiner*—Quoc-Khanh Le
*Attorney, Agent, or Firm*—Cesari & McKenna, LLP

[57] ABSTRACT

To determine the name that specifies the Systems Network Architecture logical-unit-characteristics set that a host (12) systems services control point is to associate with a TN3270 server (18) logical-unit process that is to represent a client terminal (14), the server (18) generates the name from the client's device type algorithmically, i.e., without looking the name up in a server-maintained table entered by using the device type as the key. This eliminates the need for server updates when new device types are introduced. Additionally, the algorithm used to generate the name depends on whether the client has negotiated to receive a copy of the data transmitted in the BIND message by which another logical unit initiates a session with the logical unit that will represent the client. In that way, the host's systems services control point can send the client data streams in the form that it expects, and the server is relieved of the need to perform any translation.

39 Claims, 5 Drawing Sheets

DISPLAY-MODEL MAPPING FOR TN3270 CLIENT

BACKGROUND OF THE INVENTION

The present invention is directed to computer communications. It particularly concerns what are known as TN3270 servers.

A large installed base of computer equipment employs a communications protocol known as Systems Network Architecture ("SNA"), which specifies the manner in which a host computer, for example, will communicate over a network with a device such as a terminal. At the same time, the Transmission Control Protocol/Internet Protocol ("TCP/IP") has enabled many disparate systems to communicate with each other over a wide variety of physical communications media.

To enable customers to communicate with SNA-compliant systems but take advantage of the large number of TCP/IP links, communications-equipment manufacturers have built communications gateways that translate between the two protocols. FIG. 1 depicts a typical gateway environment.

A user located in a city remote from a host mainframe computer 12 employs his terminal equipment 14, possibly in the form of a personal computer and modem, to gain access to an applications program that runs on the host 12. For this purpose, the terminal employs an Internet path 16—i.e., it employs the TCP/IP communications protocol—to establish a Telnet connection. The Telnet connection is well known to the Internet community and described in its Requests for Comments ("RFCs") 854, 860 and 862. The client terminal 14 is of a type sometimes referred to as a TN3270 emulator. The "TN" refers to the Telnet connection. The "3270" signifies that the connection's data payload, namely, lines of EBCDIC characters and display parameters, are intended to be interpreted in the way that IBM terminals and devices referred to as "3270s" do. (Actually, not all "3270"-device names take the form 327x, but all such devices do use the 3270 data stream.). Such a payload is often referred to as a "3270 data stream."

Such communication requires a TN3270 server such as server 18. Although the host in which the target application is running sometimes performs the TN3270-server process, having it do so is usually considered too prodigal a use of mainframe cycles. So FIG. 1 includes a communications channel 20 between the host 12 and the TN3270 server 18 to indicate that the TN3270 server is embodied in separate hardware.

FIG. 2 depicts a typical sequence in which such communication occurs. Row A represents the client terminal 14's initial connection to the server 18, and row B represents their initial TN3270 negotiation. For this negotiation and all subsequent communications the client and server employ the well-known TCP/IP protocol, salient features of which will now the described by reference to FIG. 3.

FIG. 3's first row represents a typical Internet Protocol datagram. The first part of the datagram is an IP header, which specifies the source and destination nodes and contains various other housekeeping information necessary for transmission from one node to the next. The datagrams' payload consists of TCP segments, each of which begins with a TCP header that specifies the source and destination ports and includes various other information employed, for instance, to guarantee reliable transmission.

The client-terminal process's TCP port number is usually arbitrary, but a TN3270 emulator connects to a server at a specific combination of IP address and TCP port number, from which the server infers that the client thereby connected wishes to use the Telnet protocol. Briefly, Telnet-implementing software typically maps the user's actual physical terminal to a "network virtual terminal," or NVT. An NVT receives and transmits the TCP-segment data as a byte stream. It interprets a byte whose first bit is zero as a symbol from "NVT ASCII," a seven-bit U.S. variant of the ASCII character set that the Internet protocol suite uses to represent letters, numbers, line feeds, carriage returns, etc. A Telnet connection also provides for in-band signaling: if the Telnet port receives an IAC ("Interpret As Command") byte, whose value is 255 (=$FF_H$), the next byte is ordinarily interpreted as a command, and that next byte may in turn indicate that a further byte or bytes should similarly be interpreted as commands.

When a Telnet client such as terminal 14 connects to a TN3270 server such as server 18, the server employs such commands to negotiate the terms of a TN3270 session. In the literature, one type of initial command used for this purpose is represented by the mnemonic code <IAC DO TN3270E>, where the DO byte (=$FD_H$) initiates an option negotiation, and the TN3270E byte (=$40_H$) specifies that the negotiated option is a TN3270 session. (The particular type of TN3270 session used as an example is the type described in RFC 1647. Another type, described in RFC 1576, is initiated by separately negotiating a number of options that individually are not peculiar to TN3270 sessions. RFC 1041 describes yet another type.)

Establishment of a TN3270 session takes the form of a "negotiation" because a Telnet receiver is not in general capable of implementing every requested option. To indicate that it can and will comply with the requested option, a receiver inserts the command sequence <IAC WILL TN3270E>into the data stream that it sends in return, where the WILL byte (=FBR) is what denotes compliance with a requested option.

In many cases, agreement on a requested option initiates further, "suboption" negotiation. Commands in such "subnegotiation" begins with the SB byte (=$FA_H$) and the code (e.g., TN3270E) for the option whose suboption is being negotiated. Subnegotiation commands end with the SE byte (=$F0_H$). In the case of a TN3270E negotiation, subnegotiation may therefore proceed as follows:

Server: IAC SB TN3270E SEND DEVICE-TYPE IAC SE

Client: IAC SB TN3270E DEVICE-TYPE REQUEST IBM-3278-5-E IAC SE

Server: IAC SB TN3270E DEVICE-TYPE IS IBM-3278-5-E IAC SE

Together, the various mnemonic codes between <IAC SB TN3270E> and <IAC SE> in these lines together represent (1) a request from the server that the client send its service type, (2) the client's specification of its device type, and (3) the server's response that it can handle the specified device type. The subnegotiation may further include the following exchange:

Client: IAC SB TN3270E FUNCTIONS REQUEST RESPONSES BIND-IMAGE IAC SE

Server: IAC SB TN3270E FUNCTIONS IS RESPONSES BIND-IMAGE IAC SE

In this exchange the client requests, and the server grants, a suboption referred to as "BIND image." That suboption's purpose will become apparent in due course.

In the particular type of TN3270 session used as the example, all non-command TCP data are interpreted as blocks delimited by the <IAC EOR> sequence, where EOR (End Of Record) represents $19_H$, and the start of each block is interpreted as a header, as FIG. 3's second row illustrates.

The server 18 is a node not only on the IP network but also on the SNA network. Communications software in an SNA node performs for each of that node's end users, such as a remote user terminal (in the case of the server node) and (in the case of the host node) the host applications program with which the user terminal is to communicate, a respective process called a logical unit ("LU"). The LU manages the data flow between the associated user and other network entities. Additionally, each node performs a further process, called a physical unit ("PU"), that manages that node equipment's LUs and presents their data to the channel 20. (For reasons not relevant to the present discussion, a given hardware node may actually have more than one PU, but little is lost by considering the special case in which each hardware node runs only a single PU process.) Finally, one of the network nodes performs a further process called a systems services control point ("SSCP"), whose responsibility is the SNA network's overall organization. (Actually, different parts of the network can be organized by SSCPs operating in different nodes, but it simplifies the discussion to consider a single-SSCP network.) The host's Virtual Telecommunication Access Method ("VTAM") software customarily provides this capability.

Now, let us assume that the host's SSCP process has already performed various initial network-organization tasks, such as activating PU and LU processes in each SNA node. For instance, although the terminal 14 typically would not have been connected when the SNA network was initialized, we assume that the SSCP has already activated LUs in the TN3270 server 18 that can represent such a client when it does become attached.

After the network has been initialized, link-level transmissions that support communication among SNA network-accessible units, i.e., among units such as the PUs, the LUs, and the SSCP, occur in basic link units whose format FIG. 4's first row depicts. If they employ the Synchronous Data Link Control ("SDLC") protocol to transmit the SNA-protocol information, the host and server employ FIG. 4's link-header and link-trailer fields to direct the resultant message units to the right data-link stations, frame the message units properly, specify the manner in which link-level operations should interpret them, and detect transmission errors. The data-link station must be specified because the signals that contain messages for the server 18 will also be received by other stations. Each of the SDLC stations may provide a link-level interface for many network-accessible units, and one station may need to forward messages to other link stations, which provide link interfaces for further network-accessible units.

The transmission header in FIG. 4's link unit specifies the origin and destination network-accessible units and provides certain format and sequencing information. The request/response unit contains the payload delivered to the software that handles be SNA operations, and each such payload unit is accompanied by a request/response header, which supports various housekeeping tasks. Much of the time the request/response unit includes segments from the data stream to be forwarded to the terminal (or other ultimate user), but request/response units come in many different types, and most of the different types represent commands or information for the SNA-operations software itself rather than terminal data or commands. For instance, in the course of initializing the network, a SSCP conventionally sends request units of the type known in SNA literature as ACTLU (ACTivate Logical Unit) to a server's PU to activate the logical units to be used for communication with clients that subsequently connect to the server. The PU determines that the message is of the ACTLU (or any other) type by inspecting its request-code field ("RC" in FIG. 4's second row) together with an "RU category" field (not shown) in the request/response header.

We now rejoin the communications scenario that FIG. 2 depicts. A new client—namely, terminal 14—has connected to the server 18 and performed a TN3270E negotiation. The server must select one of the activated LUs to mediate communications between the client terminal 14 and the host application with which it is to communicate.

But the LU selection cannot the made at random. Different clients have different capabilities, a communications session's ground rules depend on those capabilities, and host processes will observe different sets of ground rules when they communicate with different server LUs. A typical arrangement requires that the server be able to infer what those ground rules are from the name that the SSCP assigns the LU, so the LU names that the SSCP communicates to the server's PU during initialization establish different pools of LUs having respective session-parameter sets. That is, a TN3270 server conventionally must maintain a list of which LUs belong to which pools. And to select the right LU for the right client, it must incorporate a table that associates different device types with different ones of the pools into which the activated LUs can fall.

The server bases its LU selection on this information, and its PU process sends the host SSCP what is known in SNA literature as a Notify message, as FIG. 2's row C indicates, to indicate that the selected LU has been enabled. In response, the host SSCP process sends the just-enabled LU a data message whose payload is a logon greeting that the terminal 14 is to display to the human user. (Those skilled in the art will recognize that the SNA protocol requires other responses, too, but we omit them to avoid obscuring by excessive detail the facts central to the present discussion.) In 3270 parlance, this greeting is referred to as the USS10 message, and FIG. 2's row D uses that terminology. In contrast to row C's "Notify" legend, which specifies the SNA message type, the "USS10" legend in row D specifies an SNA message's data contents.

When a user has logged on, the host LU representing the applications program to which the user is to be given access initiates an LU—LU session with the terminal-representing LU by sending an SNA message of the BIND type. The contents of a BIND message establish the ground rules for an LU—LU session.

Although the whole purpose of the TN3270 session is for the payloads of various messages in this LU—LU session to be forwarded in TCP segments to the client terminal 14, the BIND message's contents relate primarily to parameters that the SNA protocol employs in carrying that payload between the host and server, so a 3270 terminal does not necessarily require access to the data that the BIND message contains. Still, certain clients can profitably employ information contained in the BIND message, and this is particularly true if the client is a printer such as printer 22 rather than a terminal.

If the client has been designed to take advantage of this information, it will have so notified the server during the TN3270 negotiation. This is the purpose of the "BIND-image" subnegotiation mentioned above. If the client has negotiated this option, the server forwards the BIND message's contents to the client. The "BIND image" notation in FIG. 2's row E represents transmitting this information as Telnet data. The contents of the TN3270 header's data-type field (FIG. 3's third row) destinguish that information from the normal 3270 data stream. (The other third-row fields are not particularly relevant to the present discussion and will not be described here.)

Now, some symbols (i.e., byte values) used in the BIND-message contents are intended to be interpreted differently from the same symbols in the normal 3270 data stream. In the literature, data intended to be so interpreted are often referred to as SCS (SNA character set) as opposed to the 3270 data stream. Terminals that have negotiated the BIND-image option therefore interpret the BIND image as SCS symbols. However, since such terminals are made aware of the occurrence of the LU—LU bind, they recognize the USS10 message as originating in the SSCP as opposed to the host application, so they conventionally interpret that message as SCS symbols, too. A consequence is that TN3270 servers have conventionally had to translate the USS10 text from a TN3270 data stream to SCS before forwarding it to clients that request a BIND image. This is the reason for the "possible translation" notation in FIG. 2's row D.

After all of these preliminaries, the TN3270 session proceeds, as FIG. 2's row E indicates.

SUMMARY OF THE INVENTION

We have recognized that traditional approaches to TN3270 server operation make the server unnecessarily cumbersome. As was explained above, for example, the server must maintain tables that set forth the correspondence between activated LUs and client device types. This requirement can be onerous for a server that must handle more than a thousand clients concurrently.

We reduce this burden by employing the so-called DDDLU ("Dynamic Definition of Dependent LUs") technique, which is used to add flexibility in other SNA contexts. In accordance with that technique, the SSCP does not necessarily activate all LUs when the network is initialized. Instead, the host maintains tables (commonly referred to as "LUGROUP" tables) of predetermined LU-characteristics sets. When a new LU is needed at a given node, the node's PU sends the SSCP a message containing the name of is one of the predetermined characteristics sets. We will refer to such names as "model strings." In response, the SSCP creates a new LU name, with which it associates the chosen model string, and it then sends the PU an ACTLU message activating an LU with the newly created LU name.

While this general approach to TN3270-server realization has been used before, we have refined it by using the DDDLU feature by which a given LU's characteristics set can be changed dynamically, i.e., without deactivating the LU. The LU can thereby be reused to represent a new TN3270 client having characteristics different from those of the client on whose behalf the LU was initially activated.

So when a new client connects, the server does not necessarily have to request that a new LU having the appropriate characteristics be activated. Instead, it often can simply request assign the new client to an already-activated but currently disabled LU. And since LU characteristics can be changed dynamically, this is true even if the client with which the LU was previously associated required different LU characteristics).

This approach greatly reduces the number of LUs that need to be activated for a given client capacity. But we have recognized that we can further refine this technique to make it even less cumbersome. As described so far, the server can still require foreknowledge of which predetermined set of model strings are to be associated with which client device types. And it also inherits another requirement that conventional approaches impose, namely, that it must "know" when and how to perform translations between a 3270 data stream and SCS data.

In contrast, we so implement the TN3270 server that it does not have to keep track of correspondences between device types and LU pools or model strings. Instead, we generate the model string algorithmically. By algorithmically we mean without looking it up in a server-maintained table entered by using the device type as the key. Then, so long as the host uses a compatible way of naming the characteristics sets, characteristics appropriate to the client will result without the server's having to maintain extensive tables. This approach has the further benefit that only host tables need to be updated when new device types having new characteristics come on the market.

In accordance with another aspect of the invention, the algorithm used to generate the model string is so designed that the model string depends on whether the client has negotiated a BIND image. LU-characteristics sets identified by model strings that result from BIND-image negotiations can additionally specify that data in SSCP-LU communications are to be expressed as SCS data rather than a normal TN3270 character stream. So the host always produces the data stream that the client expects, and the server is thereby relieved of the need to perform a translation. As a consequence, the cost of providing and maintaining a given-capacity server is significantly less than it would be otherwise.

BRIEF DESCRIPTION OF THE DRAWINGS

The invention description below refers to the accompanying drawings, of which.

DETAILED DESCRIPTION OF AN ILLUSTRATIVE EMBODIMENT

Figure 5:
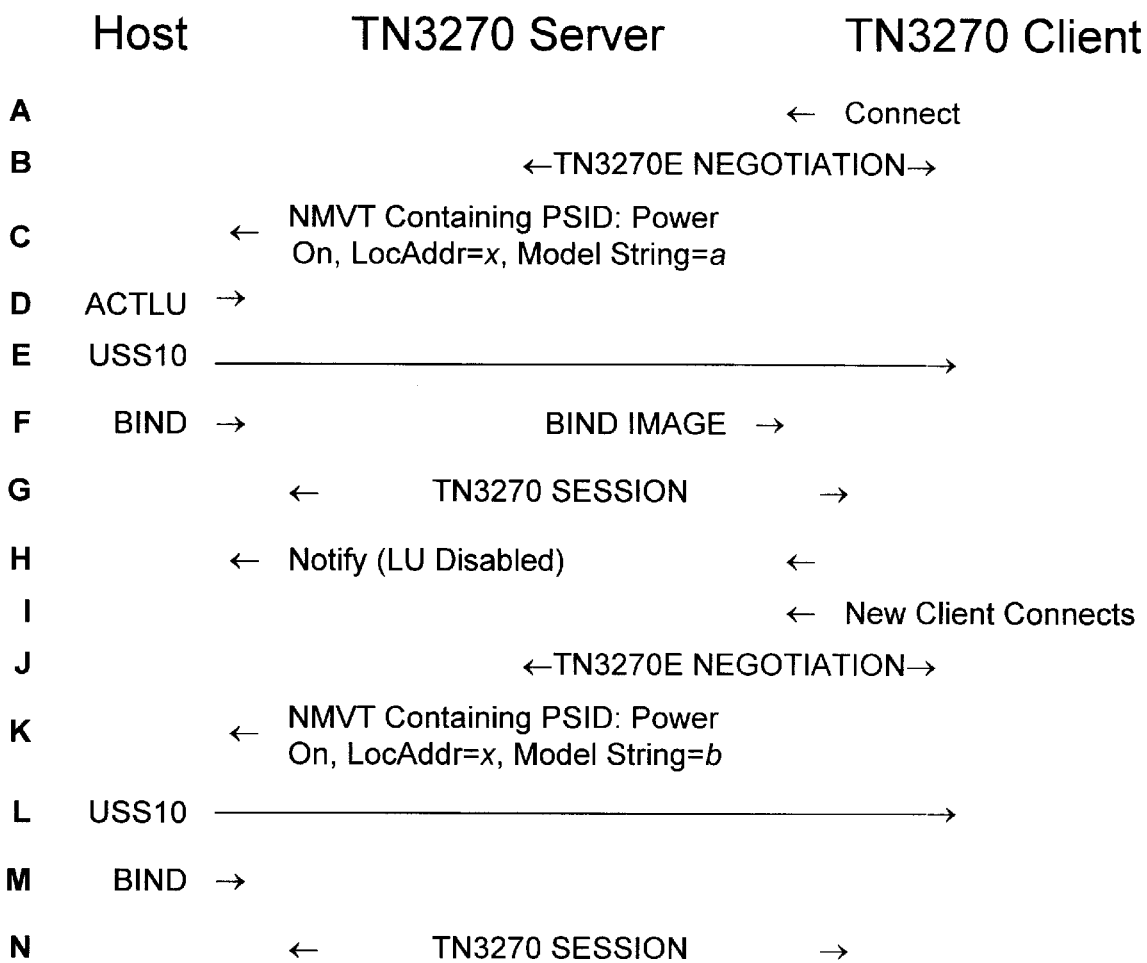
FIG. 5 is a diagram of a communications scenario that illustrates the operation of a TN3270 server that employs the present invention's teachings.
Figure 3:
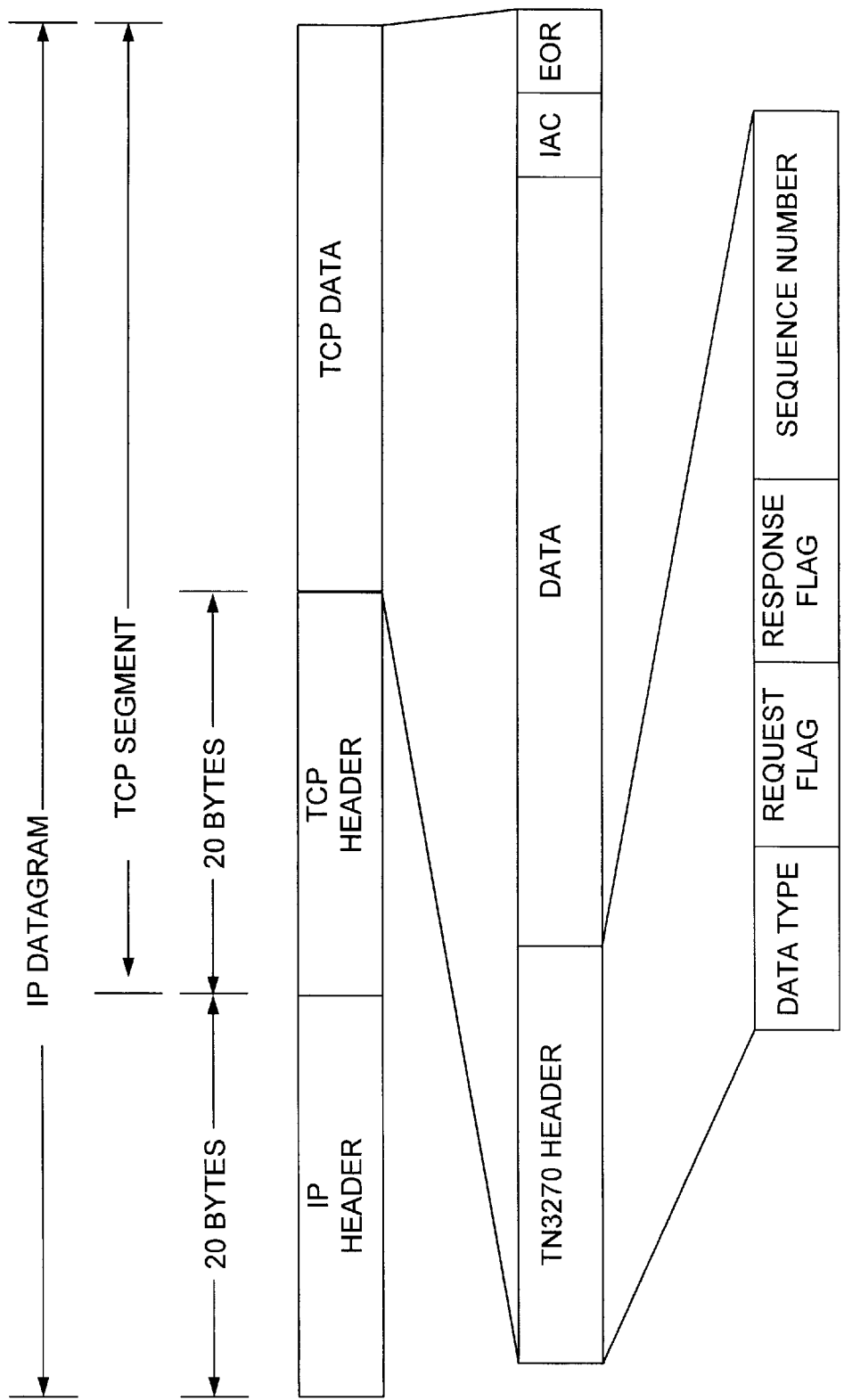
FIG. 3 is a diagram of an IP datagram that contains TN3270 data.

FIG. 5's row A represents the client 14's connection to a server 18 configured to implement the present invention's teachings. Row B represents the TN3270 negotiation previously described. But the scenario of FIG. 5 differs from that of FIG. 2 in that the system is assumed to be employing SNA's DDDLU feature, by which the host SSCP does not activate all of a PU's LUs before they are needed. Therefore, an LU may need to be activated to represent the new client. In the alternative, an existing client may need to be enabled and potentially have its characteristics changed to match the new client. In either case, the server's PU sends the host SSCP an SNA message of the type known as NMVT (Network Management Vector Transport).

Figure 4:
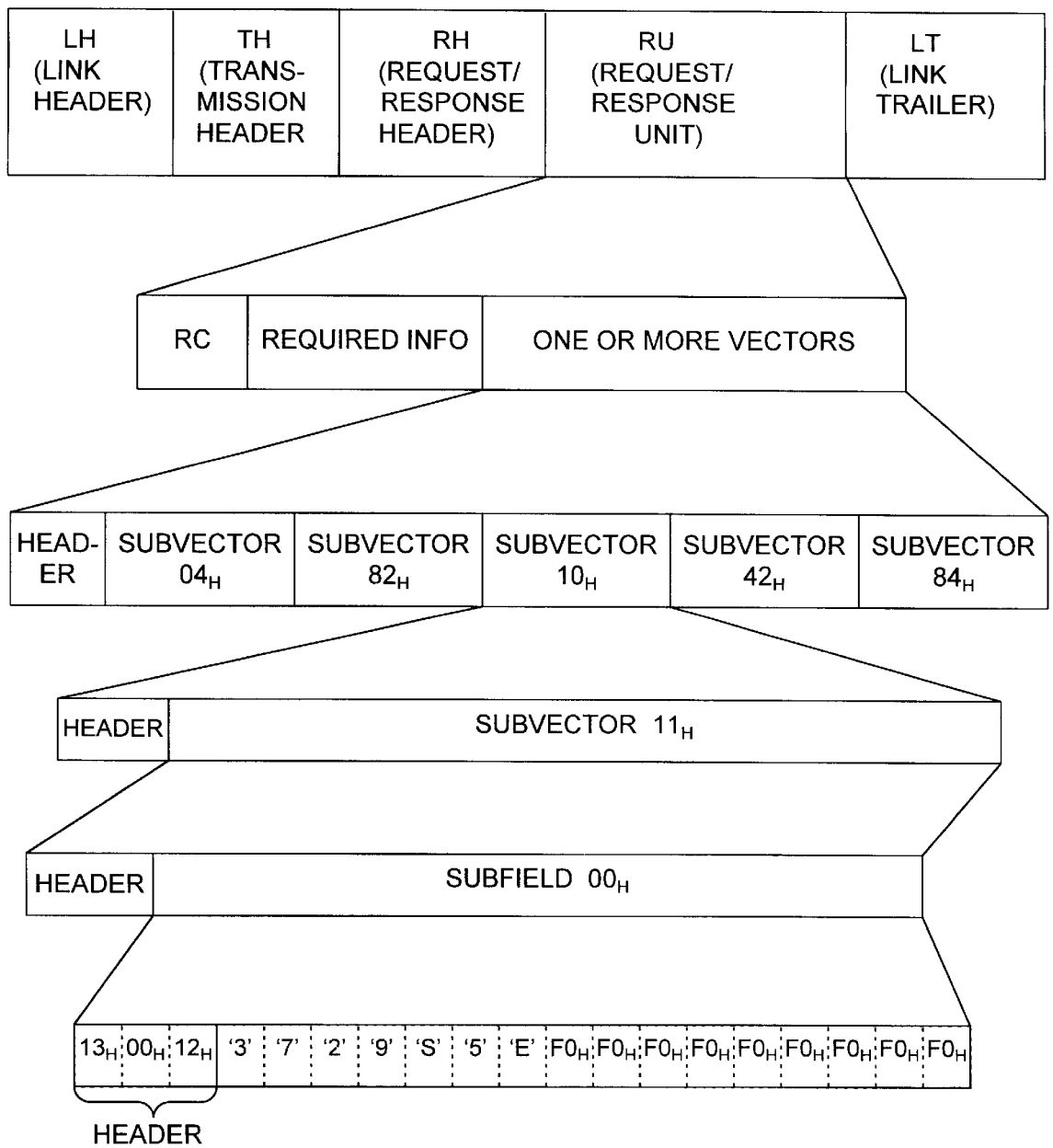
FIG. 4 is a diagram of a link unit used in implementing the SNA protocol.

FIG. 4 depicts the NMVT's format. FIG. 4's second row shows an "RC" field, which identifies the message as an NMVT, and messages of that type include various required information that follows the RC field, as FIG. 4 indicates. The remainder of an NMVT consists of one or more "vectors," which are fields that begin with headers that state the vector's length and specify a type code that indicates how the vector's contents are to be interpreted. In the illustrative example we assume that the NMVT contains only a single vector.

FIG. 4's third row depicts that vector's format. It begins with a header that specifies the vector length and type. In this case, we assume that the header specifies a type called a "Reply PSID" (Product Set ID), which itself is a container for subvectors. (The "Reply" designation is merely historical; this vector can be sent unsolicited, as it is here.) The illustrated Reply PSID as contains five subvectors, which FIG. 4 identifies by the header codes that specify their types. Those subvectors' details are not all central to an understanding of the illustrated embodiment, but we note three specifics relevant here. One is that subvector 04 specifies the local address—i.e., an address unique only among the LUs associated with the same PU—of the LU that is to represent the new client. Another is that one of subvector 82's subfields, known as the power-on-status subfield, contains a power-on-representing value, which in this context means that the LU is to be enabled.

But the subvector of particular interest in the present context is subvector 10. In the SNA protocol, this subvector is referred to as a Product Set ID common subvector, and a subvector so coded thereby indicates that its contents consist of one or more subvectors of the Product Identifier type, code 11, and the illustrated example contains only a single such subvector, as FIG. 4's fourth row indicates.

A subvector of the Product Identifier type contains one or more subfields that, as the vectors in which they are nested do, begin with a header that includes at least a length indicator and subfield-type code. FIG. 4's fifth row illustrates that organization. A three-byte header begins with a byte whose value is the length of the subfield in bytes. In the illustrated case the length is $13_H$ (i.e., 19) bytes. The second byte identifies it as a subfield of type 00, i.e., Product Identifier, and its third byte is a code that specifies a format type. Format-type code 12, which the drawing specifies, was architected to contain a four-byte machine type, a three-byte model number, a two-byte manufacturing-plant code, and a seven-byte sequence number. But this format has conventionally been adapted for DDDLU purposes to contain a seven-character model string in place of the machine type and model number, while each remaining subfield byte is $F0_H$ (EBCDIC '0').

We follow this conventional approach, but we generate the model string in a way that permits the TN3270 server to be realized much more simply. In particular, we begin with the device type furnished by the client during the TN3270 negotiation, and we generate the model string algorithmically, i.e., without looking it up in a server-maintained table entered by using the device type as the key. This eliminates the need for the server to maintain such a table, and it eliminates the need for a system administrator to update each TN3270 server's tables each time a new device type comes on the market.

Figure 6:
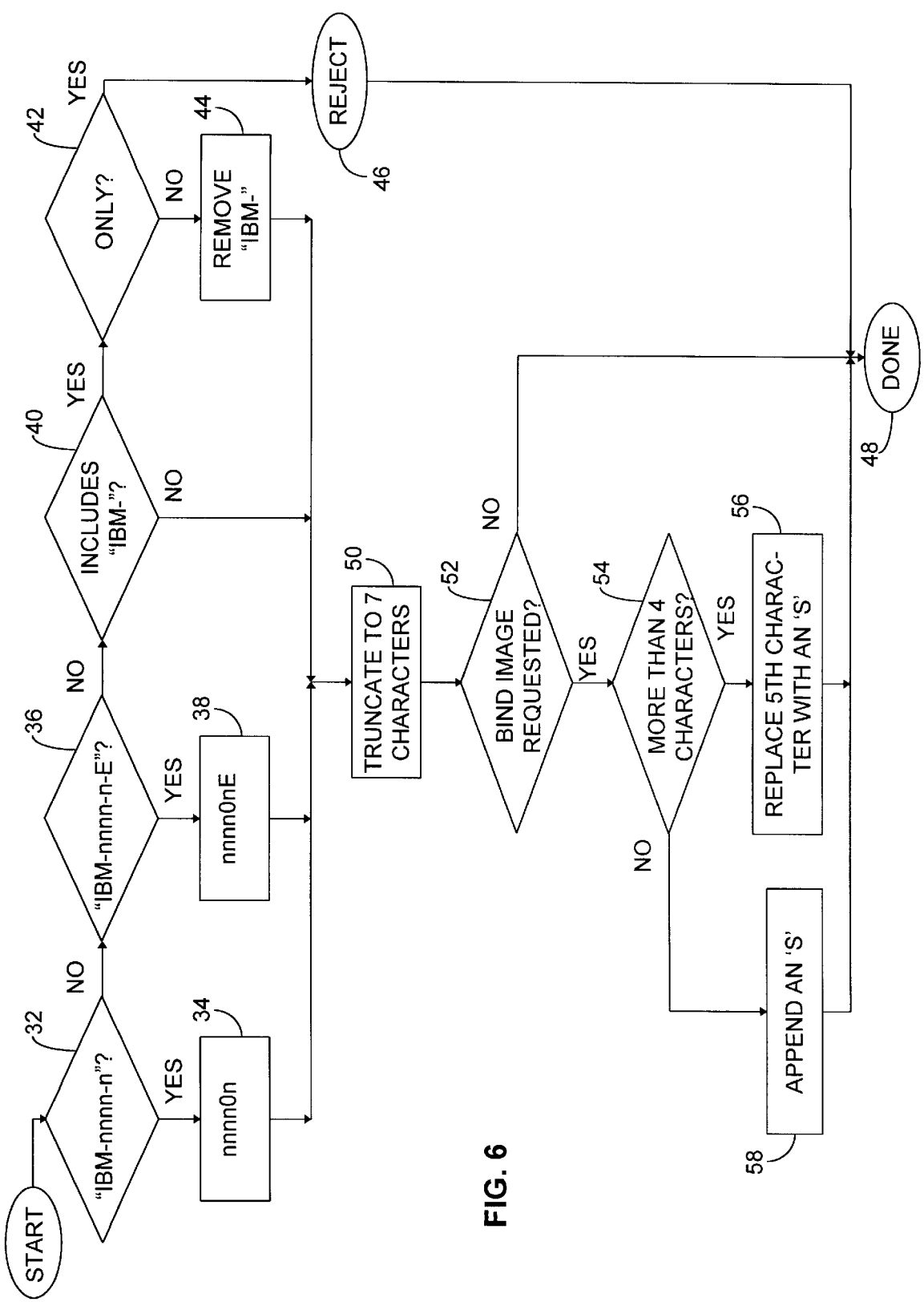
FIG. 6 is a flow chart of the illustrated embodiment's routine for generating a model string.

The particular algorithm used to implement this approach is not critical to the invention, although it is best to adopt one that is reasonably likely to produce from the (potentially twelve-character) device type an (at most seven-character) model string that is distinct from previously used model strings as new device types are encountered. FIG. 6 depicts one approach.

For the sake of concreteness, let us assume that the device type supplied by the client is "IBM-3729-5-E." Device types are supplied in ASCII but we convert them to upper-case EBCDIC for the purposes of the FIG. 6 routine. The first step 32 of the illustrated procedure is to determine whether the supplied device type is of the form "IBM-nnnn-n," where n represents a decimal digit. If so, it is converted to the form nnnn0n. But the example model name is instead of the form "IBM-nnnn-n-E," so it is initially converted to the form nnnn0n, as blocks 36 and 38 indicate. In the example, the result is "32790E" in EBCDIC.

If the device type is in neither form but does start with "IBM-," the "IBM-" is discarded unless that would result in the null string, in which case the procedure ends with the client's being rejected, as blocks 40, 42, 44, 46, and 48 indicate. And, as block 50 indicates, any characters beyond the seventh are discarded if the client is not rejected.

As described so far, the algorithm depends only on the input device type. But its output further depends on whether the client negotiated the BIND-image option during the TN3270 negotiation. If it did not, then the algorithm's output is the string constructed so far. Otherwise, an 'S' replaces the fifth character, or, if the string is less than five characters long, it is appended at the end. Blocks 52, 54, 56, and 58 illustrate this feature.

FIG. 4's bottom row depicts the inclusion of the resultant string, which in our example is "3279S5E," in the NMVT message by which the PU informs the SSCP that the LU having the subvector-04-specified local address has been enabled. The SSCP, noting that no LU having that local address has been activated for that PU, creates a new LU name and sends an ACTLU message to that PU, as FIG. 5's row D indicates, to activate the newly named LU. Row E represents the SSCP's thereafter sending that LU a message containing the "USS10" greeting to be displayed to the user.

Figure 1:
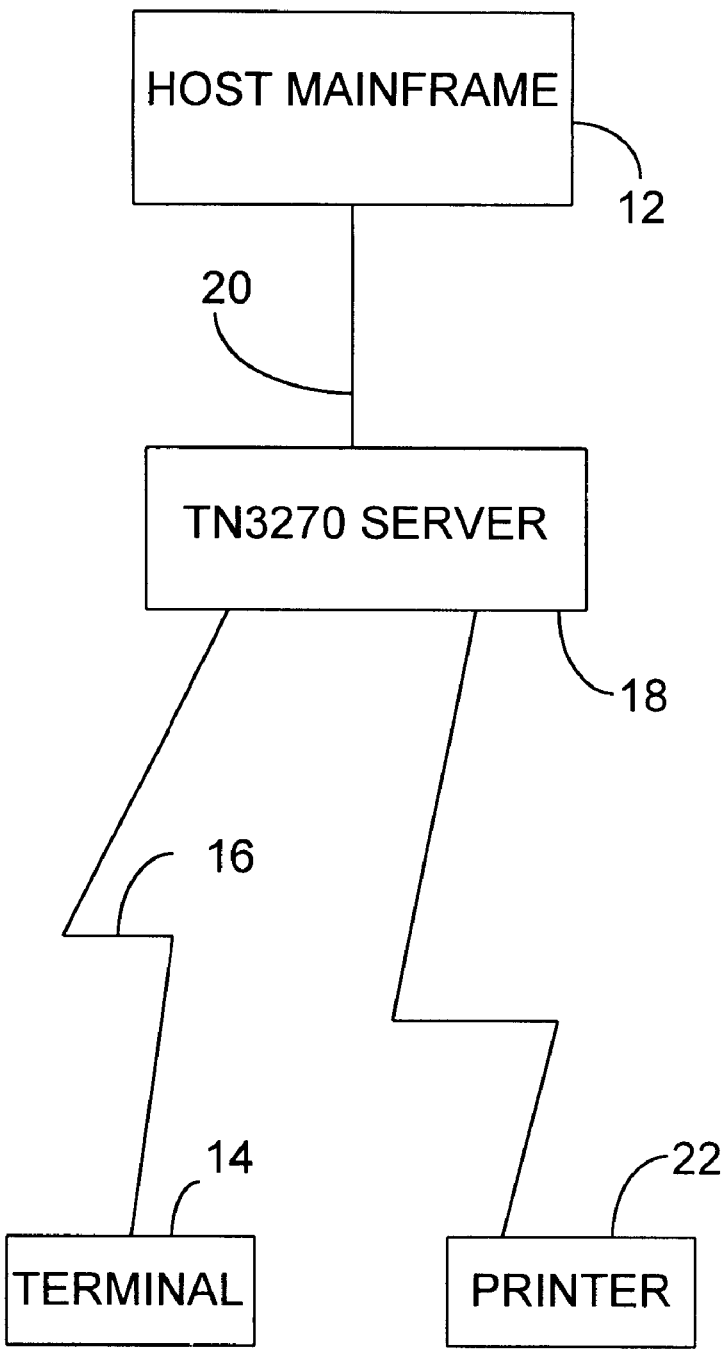
FIG. 1, previously described, is a block diagram of a communications system in which the present invention can be employed.
Figure 2:
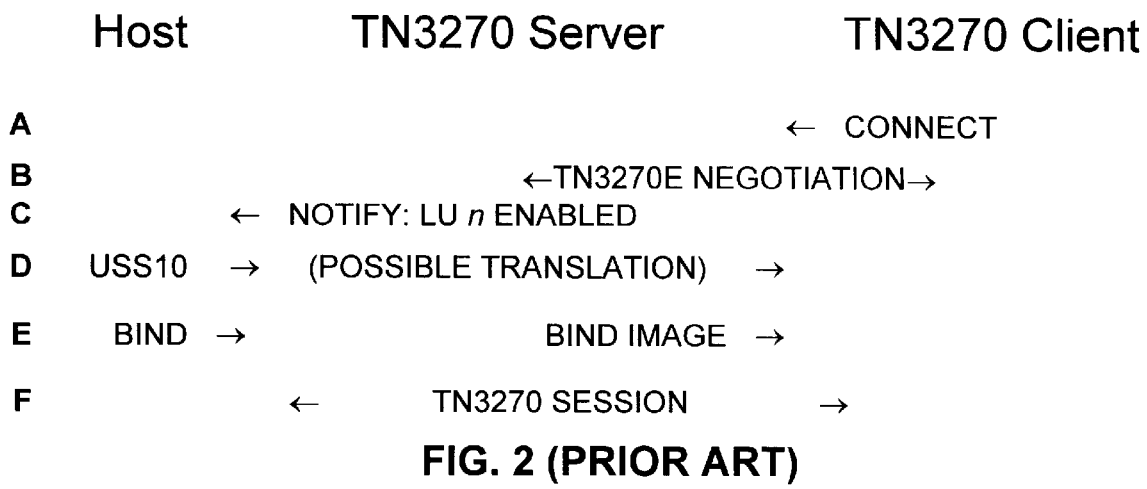
FIG. 2, previously described, is a diagram of a communications scenario typical of prior-art TN3270 servers.

Now, we observed above that different client devices do not in general expect the same character streams—i.e., some clients may interpret the same sequence of bytes differently—and one might therefore expect that the server would have to perform an appropriate translation for some clients, as FIG. 2's row D indicates. But we have avoided this by making the model string depend on negotiation of the BIND-image option, as was explained in connection with FIG. 6's blocks 52, 54, 56, and 58. LU-characteristics sets in the host table can conventionally include a specification of the data stream in which any associated LU will communicate with the SSCP. So if the LU-characteristics sets associated with the model strings resulting from a BIND-image negotiation specify the SNA character stream while the others specify the 3270 data stream, then the SSCP will send the USS10 message in the character set that the client expects, and the server is not required to perform any translation. FIG. 5's row E therefore depicts the USS10 message as being forwarded without any translation.

As is conventional, a host LU representing a host application program to which the host offers clients access then initiates a session with the new server LU, as FIG. 5's row F indicates, by way of a BIND message containing session parameters obtained from a table to which the specified LU-characteristics set points. Since we have assumed that the client negotiated the BIND-image option, FIG. 5's row F indicates that the server forwards the BIND message's contents to the client. After the ensuing TN3270 session represented by FIG. 5's row G, the server's PU sends the SSCP a Notify message represented by row H to indicate that the LU in question has been disabled.

A new client whose connection to the server is represented by row I then performs with the server a TN3270E negotiation represented by row J. Since the previously activate LU has been disabled, it is available for use by the new client, so the local address sent in row K's NMVT to alert the SSCP to an LU's enablement is the same as that in Row C. But we assume for the sake of illustration that the BIND-image option is not negotiated this time, so the FIG. 6 algorithm produces a different model string, one that specifies the normal 3270 data stream for SSCP-to-LU communications. Additionally, the SSCP this time recognizes the NMVT-specified local address as one to which an LU name has already been activated for the server's PU, so it does not need to send an ACTTU message. Instead, it merely sends a message containing the USS10 greeting to the client associated with the re-enabled LU. This time, the message is coded in the normal 3270 data stream, as the selected characteristics set specifies. But since the client in this case did not negotiate the BIND-image option, the 3270 data stream is what the client expects, so the server is again spared the need to translate the greeting, as row L indicates.

The host application's LU then sends the BIND message—without, as row M indicates, the server's forwarding the contents to the client—and the TN3270 session represented by row N proceeds.

It is apparent from the foregoing description that the present invention enables a client and host to determine the terms of their communication with a minimum of server involvement. As a result, a server that implements the present invention's teachings can be both simple in operation and modest in maintenance requirements. The present invention therefore constitutes a significant advance in the art.

What is claimed is:

1. For transferring information between a TN3270 client on a Telnet connection and a host on an SNA connection, the host maintaining a parameter table of local-unit parameter sets identified by respective model strings, a communications gateway including circuitry for:
   A) performing a TN3270 negotiation with the TN3270 client by way of a Telnet connection and thereby obtaining a device-type designation therefrom;
   B) algorithmically generating a computed model string as a function of the device-type designation;
   C) associating a given logical-unit process with the TN3270 client;
   D) by way of the SNA connection, using the computed model string to identify to the host the parameter set in accordance with which the given logical unit is to communicate; and
   E) transferring information between the host and the TN3270 client by:
      i) employing the Telnet connection to communicate with the TN3270 client; and
      ii) employing the logical-unit process to communicate with the host by way of the SNA connection.

2. A communications gateway as defined in claim 1 wherein the circuitry for generating the computed model string generates the computed model string additionally as a function of whether the TN3270 client has negotiated a BIND-IMAGE option.

3. A communications gateway as defined in claim 2 wherein the computed model string comprises an ordered sequence of characters, the character in a predetermined position in the sequence assumes a first value when the TN3270 client has negotiated the BIND-IMAGE option, and the character in the predetermined position assumes a different, second value when the TN3270 client has not negotiated the BIND-IMAGE option.

4. A communications gateway as defined in claim 1 further including circuitry for, after transferring information between the host and the first-mentioned TN3270 client:
   A) performing a TN3270 negotiation with a second TN3270 client by way of a Telnet connection and thereby obtaining therefrom a second device-type designation different from the first device-type designation;
   B) algorithmically generating a different, second computed model string as a function of the second device-type designation;
   C) associating the given logical-unit process with the second TN3270 client;
   D) by way of the SNA connection, using the second computed model string to identify to the host the parameter set in accordance with which the given logical unit is to communicate; and
   E) transferring information between the host and the second TN3270 client by:
      i) employing the Telnet connection to communicate with the second TN3270 client; and
      ii) employing the given logical-unit process to communicate with the host by way of the SNA connection.

5. A communications gateway as defined in claim 4 wherein the gateway uses the second computed model string to identify the parameter set to the host without having deactivated the given logical unit since the first-mentioned model string was used to identify the parameter set to the host.

6. A communications gateway as defined in claim 5 wherein the gateway identifies the parameter sets to the host by transmitting the computed model strings in SNA Network Management Vector Transport messages.

7. A communications gateway as defined in claim 4 wherein the circuitry for generating the computed model strings generates each computed model string additionally as a function of whether the respective TN3270 client has negotiated a BIND-IMAGE option.

8. A communications gateway as defined in claim 7 wherein the computed model strings comprise respective ordered sequences of characters, the character in a predetermined position in each said sequence assumes a first value when the respective TN3270 client has negotiated a BIND-IMAGE option, and the character in the predetermined position assumes a different, second value when the respective TN3270 client has not negotiated the BIND-IMAGE option.

9. A communications gateway as defined in claim 1 wherein the gateway identifies the parameter set to the host by transmitting the model string in an SNA Network Management Vector Transport message.

10. A communications gateway as defined in claim 9 wherein the SNA Network Management Vector Transport message contains the model string in an SNA Product Set ID vector.

11. For transferring information between a TN3270 client on a Telnet connection and a host on an SNA connection, the host maintaining a parameter table of local-unit parameter sets identified by respective model strings, a method comprising the steps of:
   A) performing a TN3270 negotiation with the TN3270 client by way of a Telnet connection and thereby obtaining a device-type designation therefrom;

B) algorithmically generating a computed model string as a function of the device-type designation;

C) associating a given logical-unit process with the TN3270 client;

D) by way of the SNA connection, using the computed model string to identify to the host the parameter set in accordance with which the given logical unit is to communicate; and E) transferring information between the host and the TN3270 client by:
   i) employing the Telnet connection to communicate with the TN3270 client; and
   ii) employing the logical-unit process to communicate with the host by way of the SNA connection.

12. A method as defined in claim 11 wherein the step of generating the computed model string comprises generating the computed model string additionally as a function of whether the TN3270 client has negotiated a BIND-IMAGE option.

13. A method as defined in claim 12 wherein the computed model string comprises an ordered sequence of characters, the character in a predetermined position in the sequence assumes a first value when the TN3270 client has negotiated the BIND-IMAGE option, and the character in the predetermined position assumes a different, second value when the TN3270 client has not negotiated the BIND-IMAGE option.

14. A method as defined in claim 11 further comprising the steps of, after transferring information between the host and the first-mentioned TN3270 client:

A) performing a TN3270 negotiation with a second TN3270 client by way of a Telnet connection and thereby obtaining therefrom a second device-type designation different from the first device-type designation;

B) algorithmically generating a different, second computed model string as a function of the second device-type designation;

C) associating the given logical-unit process with the second TN3270 client;

D) by way of the SNA connection, using the second computed model string to identify to the host the parameter set in accordance with which the given logical unit is to communicate; and E) transferring information between the host and the second TN3270 client by:
   i) employing the Telnet connection to communicate with the second TN3270 client; and
   ii) employing the given logical-unit process to communicate with the host by way of the SNA connection.

15. A method as defined in claim 14 wherein the step of using the second computed model string to identify the parameter set to the host is performed without having deactivated the given logical unit since the first-mentioned model string was used to identify the parameter set to the host.

16. A method as defined in claim 15 wherein the steps of identifying the parameter sets to the host comprise transmitting the computed model strings in SNA Network Management Vector Transport messages.

17. A method as defined in claim 14 wherein the steps of generating the computed model strings comprise generating the respective computed model strings additionally as a function of whether the respective TN3270 clients have negotiated BIND-IMAGE options.

18. A method as defined in claim 17 wherein the computed model strings comprise respective ordered sequences of characters, the character in a predetermined position in each said sequence assumes a first value when the respective TN3270 client has negotiated a BIND-IMAGE option, and the character in the predetermined position assumes a different, second value when the respective TN3270 client has not negotiated the BIND-IMAGE option.

19. A method as defined in claim 11 wherein the step of identifying the parameter set to the host comprises transmitting the computed model string in an SNA Network Management Vector Transport message.

20. A method as defined in claim 19 wherein the SNA Network Management Vector Transport message contains the model string in an SNA Product Set ID vector.

21. For transferring information between TN3270 clients on Telnet connections and a host on an SNA connection, the host maintaining a parameter table of local-unit parameter sets identified by respective model strings, a communications gateway including circuitry for:

A) performing a TN3270 negotiation with a first TN3270 client by way of a Telnet connection;

B) associating a given logical-unit process with the TN3270 client;

C) by way of the SNA connection, using a first model string to identify to the host the parameter set in accordance with which the given logical unit is to communicate;

D) transferring information between the host and the first TN3270 client by:
   i) employing the Telnet connection to communicate with the TN3270 client; and
   ii) employing the logical-unit process to communicate with the host by way of the SNA connection;

E) performing a TN3270 negotiation with a second TN3270 client by way of a Telnet connection;

F) associating the given logical-unit process with the second TN3270 client;

G) without having deactivated the given logical unit since the first model string was used to identify the parameter set in accordance with which the given logical unit was to communicate, using a different, second model string to identify to the host by way of the SNA connection the parameter set in accordance with which the given logical unit is to communicate;

H) transferring information between the host and the second TN3270 client by:
   i) employing the Telnet connection to communicate with the second TN3270 client; and
   ii) employing the logical-unit process to communicate with the host by way of the SNA connection.

22. A communications gateway as defined in claim 21 the gateway identifies the parameter sets to the host by transmitting the computed model strings in SNA Network Management Vector Transport messages.

23. A communications gateway as defined in claim 22 wherein the SNA Network Management Vector Transport messages contain the model strings in SNA Product Set ID vectors.

24. For transferring information between TN3270 clients on Telnet connections and a host on an SNA connection, the host maintaining a parameter table of local-unit parameter sets identified by respective model strings, a method comprising the steps of:

A) performing a TN3270 negotiation with a first TN3270 client by way of a Telnet connection;

B) associating a given logical-unit process with the TN3270 client;

C) by way of the SNA connection, using a first model string to identify to the host the parameter set in accordance with which the given logical unit is to communicate;

D) transferring information between the host and the first TN3270 client by:
  i) employing the Telnet connection to communicate with the TN3270 client; and
  ii) employing the logical-unit process to communicate with the host by way of the SNA connection;

E) performing a TN3270 negotiation with a second TN3270 client by way of a Telnet connection;

F) associating the given logical-unit process with the second TN3270 client;

G) without having deactivated the given logical unit since the first model string was used to identify the parameter set in accordance with which the given logical unit was to communicate, using a different, second model string to identify to the host by way of the SNA connection the parameter set in accordance with which the given logical unit is to communicate;

H) transferring information between the host and the second TN3270 client by:
  i) employing the Telnet connection to communicate with the second TN3270 client; and
  ii) employing the logical-unit process to communicate with the host by way of the SNA connection.

25. A method as defined in claim 24 wherein the steps of using model strings to identify to the host the parameter set in accordance with which the given logical unit is to communicate comprises transmitting the model string in an SNA Network Management Vector Transport message.

26. A method as defined in claim 25 wherein the SNA Network Management Vector Transport message contains the model string in a Product Set ID vector.

27. For transferring information between a TN3270 client on a Telnet connection and a host on an SNA connection, the host maintaining a parameter table of local-unit parameter sets identified by respective model strings, a communications gateway comprising:

A) means for performing a TN3270 negotiation with the TN3270 client by way of a Telnet connection and thereby obtaining a device-type designation therefrom;

B) means for algorithmically generating a computed model string as a function of the device-type designation;

C) means for associating a given logical-unit process with the TN3270 client;

D) by way of the SNA connection, using the computed model string to identify to the host the parameter set in accordance with which the given logical unit is to communicate; and E) means for transferring information between the host and the TN3270 client by:
  i) employing the Telnet connection to communication with the TN3270 client; and
  ii) employing the logical-unit process to communicate with the host by way of the SNA connection.

28. A communications gateway as defined in claim 27 wherein the means for generating the computed model string comprises means for generating the computed model string additionally as a function of whether the TN3270 client has negotiated a BIND-IMAGE option.

29. A communications gateway as defined in claim 28 wherein the computed model string comprises an ordered sequence of characters, the character in a predetermined position in the sequence assumes a first value when the TN3270 client has negotiated the BIND-IMAGE option, and the character in the predetermined position assumes a different, second value when the TN3270 client has not negotiated the BIND-IMAGE option.

30. A communication gateway as defined in claim 27 further comprising means for, after transferring information between the host and the first-mentioned TN3270 client:

A) performing a TN3270 negotiation with a second TN3270 client by way of a Telnet connection and thereby obtaining therefrom a second device-type designation different from the first device-type designation;

B) algorithmically generating a different, second computed model string as a function of the second device-type designation;

C) associating the given logical-unit process with the second TN3270 client;

D) by way of the SNA connection, using the second computed model string to identify to the host the parameter set in accordance with which the given logical unit is to communicate; and E) transferring information between the host and the second TN3270 client by:
  i) employing the Telnet connection to communication with the second TN3270 client; and
  ii) employing the given logical-unit process to communicate with the host by way of the SNA connection.

31. A communications gateway as defined in claim 30 wherein the means for using the second computed model string to identify the parameter set to the host does so without having deactivated the given logical unit since the first-mentioned model string was used to identify the parameter set to the host.

32. A communications gateway as defined in claim 31 wherein the means for identifying the parameter sets to the host comprise means for transmitting the computed model strings in SNA Network Management Vector Transport messages.

33. A communications gateway as defined in claim 30 wherein the means for generating the computed model strings comprise means for generating the respective computed model strings additionally as a function of whether the respective TN3270 clients have negotiated BIND-IMAGE options.

34. A communications gateway as defined in claim 33 wherein the computed model strings comprise respective ordered sequences of characters, the character in a predetermined position in each said sequence assumes a first value when the respective TN3270 client has negotiated a BIND-IMAGE option, and the character in the predetermined position assumes a different, second value when the respective TN3270 client has not negotiated the BIND-IMAGE option.

35. A communications gateway as defined in claim 27 wherein the means for identifying the parameter set to the host comprises means for transmitting the computed model string in an SNA Network Management Vector Transport message.

36. A communications gateway as defined in claim 35 wherein the SNA Network Management Vector Transport message contains the model string in an SNA Product Set ID vector.

37. For transferring information between TN3270 clients on Telnet connections and a host on an SNA connection, the host maintaining a parameter table of local-unit parameter sets identified by respective model strings, a communications gateway:

A) means for performing a TN3270 negotiation with a first TN3270 client by way of a Telnet connection;

B) means for associating a given logical-unit process with the TN3270 client;

C) means for, by way of the SNA connection, using a first model string to identify to the host the parameter set in accordance with which the given logical unit is to communicate;

D) means for transferring information between the host and the first TN3270 client by:
   i) employing the Telnet connection to communicate with the TN3270 client; and
   ii) employing the logical-unit process to communicate with the host by way of the SNA connection;

E) means for performing a TN3270 negotiation with a second TN3270 client by way of a Telnet connection;

F) means for associating the given logical-unit process with the second TN3270 client;

G) means for, without having deactivated the given logical unit since the first model string was used to identify the parameter set in accordance with which the given logical unit was to communicate, using a different, second model string to identify to the host by way of the SNA connection the parameter set in accordance with which the given logical unit is to communicate;

H) means for transferring information between the host and the second TN3270 client by:
   i) employing the Telnet connection to communicate with the second TN3270 client; and
   ii) employing the logical-unit process to communicate with the host by way of the SNA connection.

38. A communications gateway as defined in claim 37 wherein the means for using model strings to identify to the host the parameter set in accordance with which the given logical unit is to communicate comprises means for transmitting the model string in an SNA Network Management Vector Transport message.

39. A communications gateway as defined in claim 38 wherein the SNA Network Management Vector Transport message contains the model string in a Product Set ID vector.

* * * * *